(12) United States Patent
Zeroug et al.

(10) Patent No.: US 9,829,597 B2
(45) Date of Patent: Nov. 28, 2017

(54) MODEL BASED INVERSION OF ACOUSTIC IMPEDANCE OF ANNULUS BEHIND CASING

(71) Applicant: SCHLUMBERGER TECHNOLOGY CORPORATION, Sugar Land, TX (US)

(72) Inventors: Smaine Zeroug, Belmont, MA (US); Jiaqi Yang, Lexington, MA (US); Sandip Bose, Brookline, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 210 days.

(21) Appl. No.: 14/887,653

(22) Filed: Oct. 20, 2015

(65) Prior Publication Data

US 2016/0109604 A1 Apr. 21, 2016

Related U.S. Application Data

(60) Provisional application No. 62/066,283, filed on Oct. 20, 2014.

(51) Int. Cl.
 *G01V 1/50* (2006.01)
 *E21B 47/00* (2012.01)

(52) U.S. Cl.
 CPC ............ *G01V 1/50* (2013.01); *E21B 47/0005* (2013.01)

(58) Field of Classification Search
 CPC ................................ G01V 1/50; E21B 47/005
 (Continued)

(56) References Cited

U.S. PATENT DOCUMENTS 5,216,638 A 6/1993 Wright
7,095,676 B2 * 8/2006 D'Angelo .............. G01N 29/07
 367/31
(Continued)

OTHER PUBLICATIONS

Foldy et al., "A General Theory of Passive Linear Electroacoustic Transducers and the Electroacoustic Reciprocity Theorem. I", The Journal of the Acoustical Society of America, vol. 17, No. 2, Oct. 1945, pp. 109-120.
(Continued)

*Primary Examiner* — Ian J Lobo
(74) *Attorney, Agent, or Firm* — Michael Dae

(57) ABSTRACT

Techniques involve obtaining acoustic data from an acoustic logging tool, where the acoustic data includes waves reflected from the casing, the annular fill material, the formation, and/or interfaces between any of the casing, the annular fill material, and the formation. A crude casing thickness, tool position (e.g., eccentering), mud sound velocity may be estimated using the acoustic data. A specular reflection signal may also be estimated based on the acoustic data. A modeled waveform may be generated using the estimated specular reflection signal and one or more model parameters, such as an estimated crude casing thickness, an estimated tool position, an estimated sound velocity of mud between the acoustic logging tool and the casing, an estimated impedance of the annular fill material, and an estimated impedance of the mud. The modeled waveform may be calibrated in some embodiments. Furthermore, a casing thickness may be estimated by matching the modeled waveform with the corresponding measured acoustic data. The techniques may output one or more of a thickness of the casing, an apparent impedance of the annular fill material, and the impedance of mud.

15 Claims, 8 Drawing Sheets

(58) Field of Classification Search
USPC .......................................... 367/35; 181/105
See application file for complete search history.

(56) References Cited

U.S. PATENT DOCUMENTS

| | | | |
|---|---|---|---|
| 9,732,607 B2* | 8/2017 | Zeroug | ................. E21B 47/091 |
| 2009/0141943 A1* | 6/2009 | Liu | ..................... E21B 47/0002 |
| | | | 382/109 |
| 2015/0218930 A1* | 8/2015 | Zeroug | ............... E21B 47/0005 |
| | | | 367/26 |
| 2015/0219780 A1* | 8/2015 | Zeroug | ............... E21B 47/0005 |
| | | | 702/6 |

OTHER PUBLICATIONS

Habashy et al., "A general framework for constraint minimization for the inversion of electromagnetic measurements", Progress in Electromagnetics Research, PIER 46, 2004, pp. 265-312.

Randall et al., "Mathematical model for internal ultrasonic inspection of cylindrically layered structures", The Journal of the Acoustical Society of America, vol. 83, No. 4, Apr. 1988, pp. 1295-1305.

Zeroug et al., "A complex-transducer-point model for finite emitting and receiving ultrasonic transducers", Wave Motion, vol. 24, 1996, pp. 21-40.

Zeroug et al., "Spectral Integral Formulae for the Response of Acoustic Transducers in Cylindrically Curved Configuration", IEEE Transactions on Ultrasonics, Ferroelectrics, and Frequency Control, vol. 45, No. 3, May 1998, pp. 768-778.

Zeroug et al., "Ultrasonic pulsed beam interaction with a fluid-loaded elastic plate: Experimental validation", The Journal of the Acoustical Society of America, vol. 100, No. 3, Sep. 1996, pp. 1349-1356.

Zeroug et al., "Ultrasonic pulsed beam interaction with a fluid-loaded elastic plate: Theory", The Journal of the Acoustical Society of America, vol. 100, No. 3, Sep. 1996, pp. 1339-1348.

Zeroug et al., "Well Integrity—Cement Evaluation", Sonatrach-Schlumberger Well Evaluation Conference, Algeria, 2007, pp. 5.32-5.45.

* cited by examiner

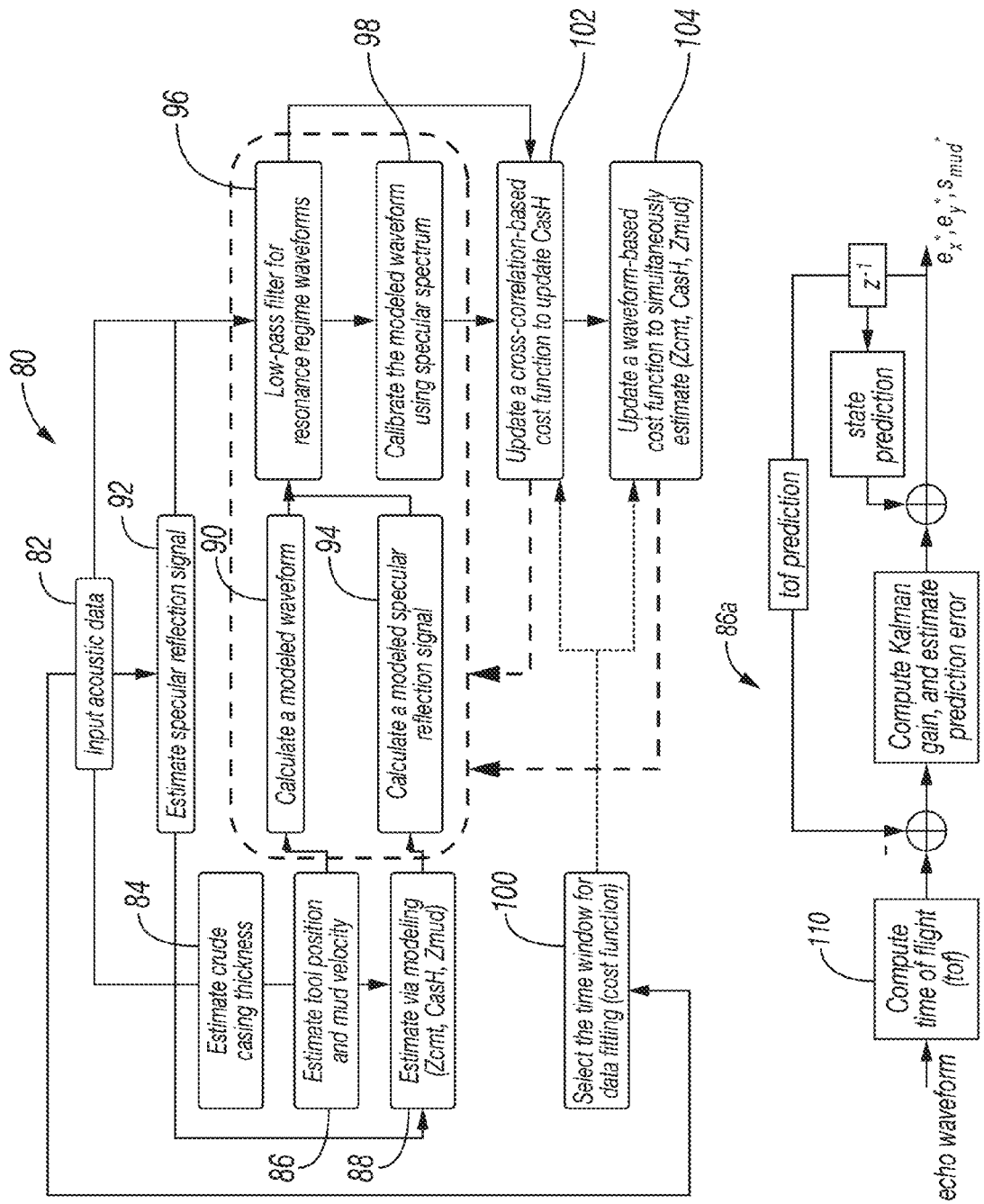

MODEL BASED INVERSION OF ACOUSTIC IMPEDANCE OF ANNULUS BEHIND CASING

RELATED APPLICATIONS

This application claims the benefit of and priority to U.S. Provisional Patent Application No. 62/066,283, entitled "Model Based Inversion of Acoustic Impedance of Annulus behind Casing from Ultrasonic Pulse Echo Measurements," filed Oct. 20, 2014.

BACKGROUND

The present invention relates to techniques for performing wellbore operations. More particularly, the present invention relates to techniques for determining characteristics of subterranean formations using acoustic wellbore data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

In a well completion, a string of casing or pipe is typically set in a wellbore, and a annulus fill material (e.g., cement) is disposed in the annular space between the casing and the earth formation. One objective of filling the annular space is to separate oil- and gas-producing layers from each other, and from water-bearing formation strata. If the cement fails to provide isolation of one zone from another, fluids under pressure may migrate from one zone to another, reducing production efficiency. Also, migration of hydrocarbons into aquifers is environmentally and economically undesirable. Evaluating the annulus content is important for reliable determination of the zonal isolation of the different strata of a formation.

Acoustic evaluation is often used to determine whether the cement provides hydraulic zonal isolation between formation strata traversed by the drilled well. Certain acoustic measurements, such as the ultrasonic pulse-echo measurement, has been widely used in cement evaluation to provide the effective acoustic impedance of the annulus material adjacent to the casing with high azimuthal and axial resolution and thereby evaluate cement characteristics and zonal isolation. For example, an ultrasonic pulse-echo tool may transmit a broadband pulse, usually between 200 and 700 kHz, to the casing wall to excite a thickness resonance mode in the casing. The acquired signals may be processed using modeling techniques to estimate the annular acoustic impedance. However, some conventional approaches are more suitable for thinner casings (e.g., casings thinner than 12 mm), and have not been as suitable for the larger and thicker casings in acoustically-attenuative (heavier) borehole muds that are more commonly used today. Such wellbore environments can result in acoustic behavior that reduces the accuracy of cement evaluation.

SUMMARY

A summary of certain embodiments disclosed herein is set forth below. It should be understood that these aspects are presented merely to provide the reader with a brief summary of these certain embodiments and that these embodiments are not intended to limit the scope of the systems and methods described herein. Indeed, embodiments of systems and methods described herein may encompass a variety of aspects that may not be set forth below.

Embodiments described herein relate to systems, methods, and computer-readable media for the evaluation of wellbore annulus properties based on inversion of acoustic measurements. According to some embodiments, a method is provided for determining properties of a wellbore in a formation, the wellbore comprising a casing and an annular fill material between the casing and the formation. The method includes obtaining from an acoustic logging tool, acoustic data comprising acoustic waves reflected from the casing, the annular fill material, the formation, one or more interfaces between any of the casing, the annular fill material, and the formation, or combinations thereof and estimating a crude casing thickness, a tool position, and a velocity of mud between the acoustic logging tool and the casing, or combinations thereof, based on the acoustic data. The method further includes estimating a specular reflection signal based on the acoustic data and generating a modeled waveform using the estimated specular reflection signal and one or more model parameters including an estimated crude casing thickness, an estimated tool position, an estimated sound velocity of mud between the acoustic logging tool and the casing, an estimated impedance of the annular fill material, and an estimated impedance of the mud. The method further involves matching the modeled waveform with the acoustic data and determining one or more of a thickness of the casing, an apparent impedance of the annular fill material, and the impedance of mud, based on the match of the modeled waveform with the acoustic data.

Additionally, in some embodiments, a method is provided for measuring an acoustic waveform at an acoustic transducer in a wellbore comprising casing and annular material, where the measured acoustic waveform is a reflection from the wellbore. The method also involves estimating, using the measured waveform, a thickness of the casing, a positioning of the acoustic tool, and a mud acoustic impedance and modeling a modeled waveform based on one or more of the estimated casing thickness, the mud acoustic impedance, the tool positioning, an estimated sound velocity of mud between the acoustic logging tool and the casing, an estimated impedance of the annular fill material, and an estimated impedance of the mud. The method also includes estimating an estimated specular reflection signal based on the measured waveform, estimating a modeled specular reflection signal based on the modeled waveform, calibrating the modeled waveform for a calibrated waveform, based on the estimated specular reflection signal and the modeled specular reflection signal, and comparing the calibrated waveform with the measured waveform. The model may estimate a thickness of the casing based on the comparison of the modeled waveform with the measured acoustic waveform.

Moreover, in some embodiments, a non-transitory computer-readable medium storing computer-executable instructions is provided. When executed by at least one processor, the instructions cause the at least one processor to perform the following: inputting, from an acoustic tool deployed in a wellbore comprising casing and annular fill, a measured waveform comprising one or more reflected acoustic waves; estimating, using the measured waveform, a thickness of the casing and a positioning of the acoustic tool; modeling a modeled waveform based on the calculated thickness and the positioning; estimating an estimated specular reflection signal based on the measured waveform; estimating a modeled reflection signal based on the modeled waveform; calibrating the modeled waveform for a calibrated waveform, based on the estimated specular reflection signal and the modeled specular reflection signal; comparing the calibrated waveform with the measured waveform; and estimating one or more of a casing thickness, an apparent impedance of the annular fill, and an apparent impedance of mud between the casing and the acoustic tool based on the comparison of the calibrated waveform with the measured waveform.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Additionally, depending on the context, singular and plural terminology may be used interchangeably.

FIG. 6 is a block diagram of a workflow for a model-based inversion technique in accordance with one or more example embodiments.

FIG. 7 is a schematic representing a Kalman filter for estimating tool positioning and mud slowness in accordance with one or more example embodiments.

DETAILED DESCRIPTION

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
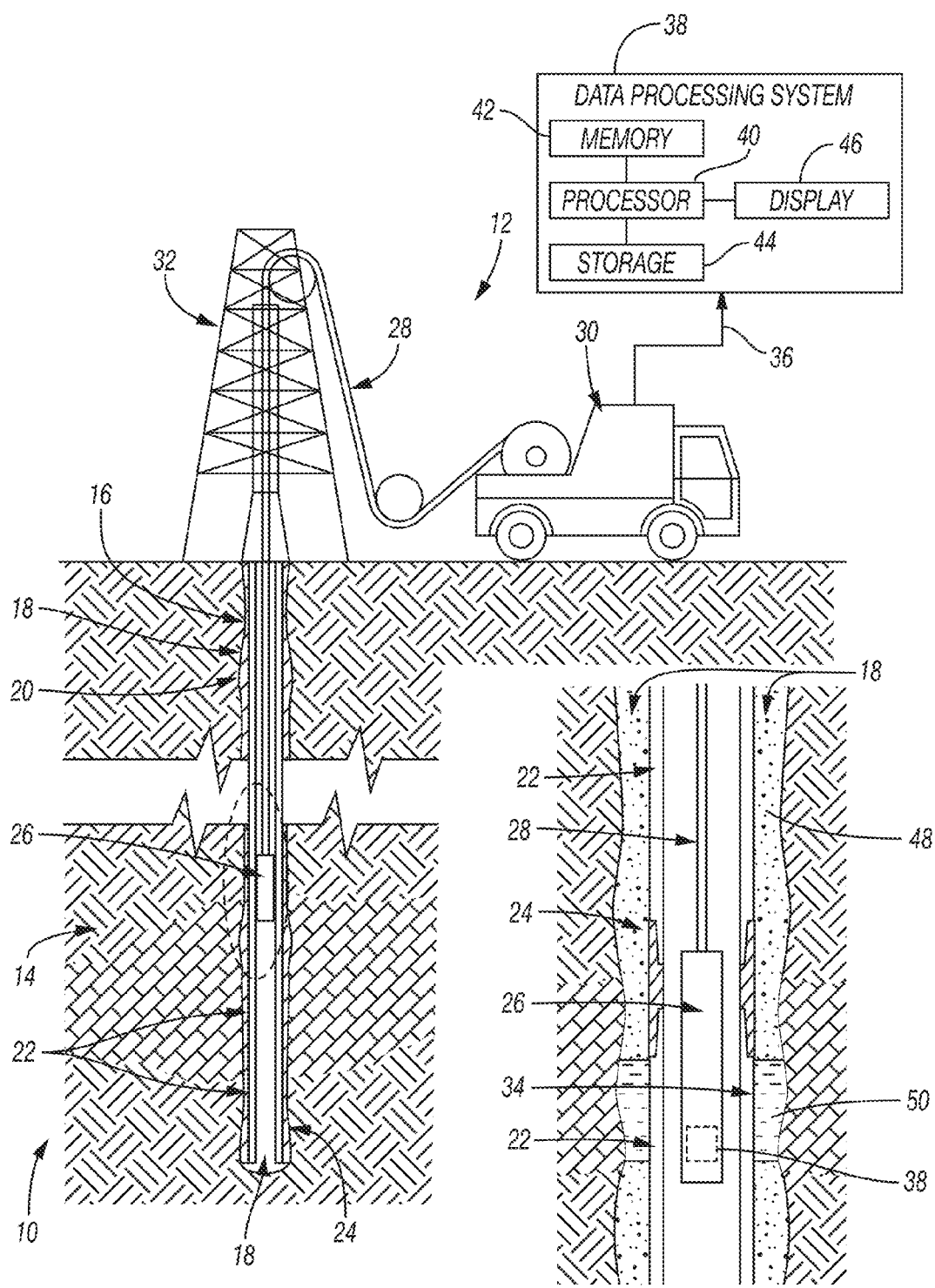
FIG. 1 is a schematic diagram of an example system for evaluating cement installation and zonal isolation of a well in accordance with one or more example embodiments.

FIG. 1 schematically illustrates an example system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 has been used to seal an annulus 20—the space between the wellbore 16 and casing joints 22 and collars 24—with cementing operations. In some embodiments, the annular fill 18 may include cement, resin, or any other material suitable for filling the annulus 20.

As seen in FIG. 1, several casing joints 22 (also referred to below as casing 22) represent lengths of pipe that are coupled together by the casing collars 24 to form a casing string which stabilizes the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation and well integrity data (e.g., casing thickness, apparent acoustic impedance, drilling fluid impedance, etc.) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. In some embodiments, drilling fluid or mud 25 may be present around the acoustic logging tool 26 as it is conveyed in the wellbore 16.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic data 36 (e.g., acoustic waveforms) used to evaluate the integrity of the cased wellbore 16. When the acoustic logging tool 26 provides such measurements to the surface equipment 12 (e.g., through the cable 28), the surface equipment 12 may pass the measurements as acoustic data 36 to a data processing system 38 (e.g., a cement evaluation system) that includes a processor 40, memory 42, storage 44, and/or a display 46. In other examples, the acoustic data 36 may be processed by a similar data processing system 38 at any other suitable location. For example, in some embodiments, all or a portion of data processing may be performed by a data processing system 38 in the acoustic logging tool 26 or near the acoustic logging tool 26 downhole.

The data processing system 38 may collect the acoustic data 36 which may be evaluated to estimate properties associated with the integrity of the wellbore 16, such as a thickness of the casing 22, an apparent acoustic impedance of the annular fill 18, and/or an apparent acoustic impedance of the drilling fluid 25. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, etc. The display 46 may be any suitable electronic display that can display the logs and/or other information relating to classifying the material in the annulus 20 behind the casing 22. The processor 40 is not limited to any particular device type or system. The processor 40 may be a computer, such as a laptop computer, a desktop computer, or a mainframe computer. The processing system may include a graphical user interface (GUI) so that a user can interact with the processor 40. The processor 40 may also include a processor (e.g., a microprocessor, microcontroller, digital signal processor, or general purpose computer) for executing any of the methods and processes described herein.

In some embodiments, the acoustic data 36 from the acoustic logging tool 26 may be used to determine the presence of solid cement in the annular fill 18 has been installed as expected. In some cases, the acoustic data 36 may be evaluated to determine whether the cement of the annular fill 18 has a generally solid character (e.g., as indicated at numeral 48) and therefore has properly set. In other cases, the acoustic data 36 may indicate the potential absence of cement or that the annular fill 18 has a generally liquid or gas character (e.g., as indicated at numeral 50), which may imply that the cement of the annular fill 18 has not properly set.

The acoustic logging tool 26 may be, for example, an UltraSonic Imager (USI™) tool and/or an Isolation Scanner™ tool by Schlumberger. The acoustic logging tool 26 may obtain acoustic data 36 to evaluate properties of the cased wellbore 16 in accordance with embodiments of the present techniques. For instance, the acoustic logging tool 26 may obtain a pulse echo measurement that exploits the thickness mode (e.g., in the manner of an ultrasonic imaging tool) or may perform a pitch-catch measurement that exploits the casing flexural mode. The ultrasonic pitch-catch technique may be based on exciting and detecting from the casing quasi-Lamb modes with emphasis on the lowest-order anti-symmetric mode (AO) often referred as the flexural mode. The casing flexural mode also radiates elastic energy into the annulus between casing and formation (or between a primary casing and a secondary one as it occurs for multiple string situations). When the annulus is filled with cement, either a shear wave only or both shear and compressional waves may be radiated into the cement layer, depending on the mechanical properties of the cement or annulus material.

Figure 2:
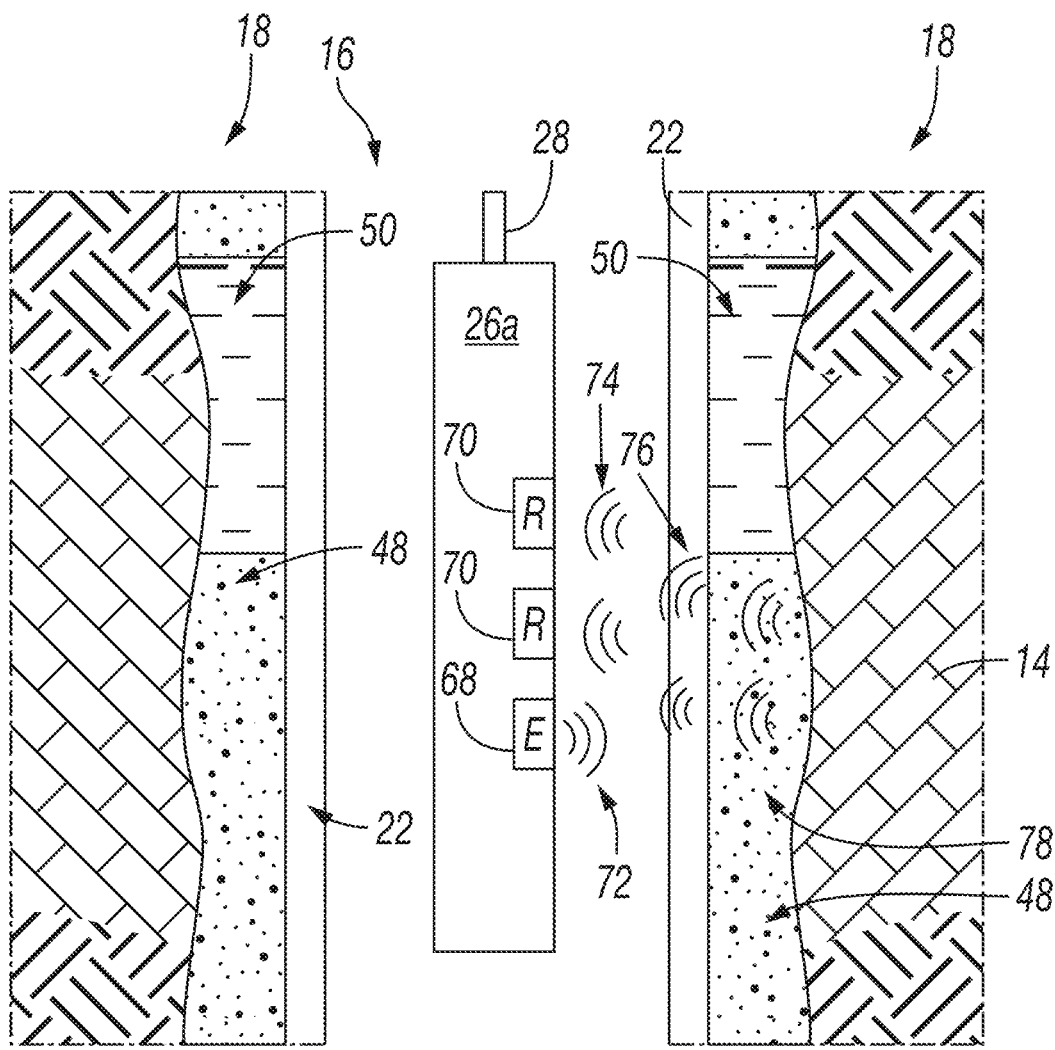
FIG. 2 is a schematic representation of an example acoustic downhole tool to obtain pitch-catch acoustic cement evaluation data in accordance with one or more example embodiments.

FIG. 2 provides an example embodiment of the acoustic logging tool 26a having an emitter 68 and a pair of receiver transducers 70. The emitter 68 in the acoustic logging tool 26a may emit acoustic energy 72 out toward the casing 22 resulting in reflected waves 74, 76, and 78. In the embodiments shown in FIG. 2, the emitted energy excites a predominantly zeroth-order asymmetric mode (also referred to as flexural mode). As in the embodiment described above, the acoustic waves 72 propagate via transmission into both sides of the casing wall 22. The transmission in the casing annulus depends on the material on the outer side of the casing wall with a different amount of energy leak inside the annulus. The acoustic logging tool embodiment depicted in FIG. 2 may use measurements of acoustic impedance from flexural attenuation. The different distance from the emitter 68 and the two receiver transducers 70 and the energy leak induce different amplitudes on the measured acoustic pressure.

Figure 3:
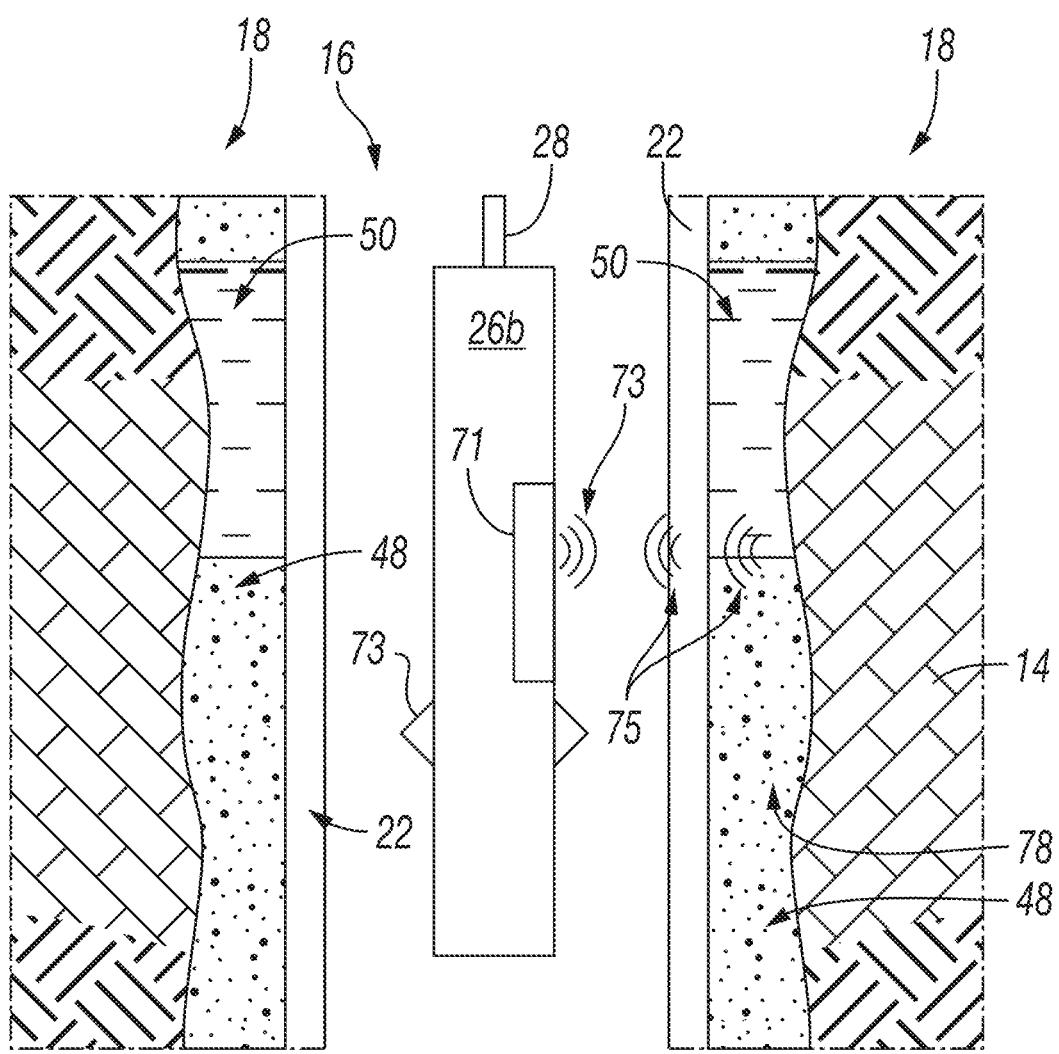
FIG. 3 is a schematic representation of an example acoustic downhole tool to obtain pulse-echo acoustic cement evaluation data in accordance with one or more example embodiments.

FIG. 3 is another example embodiment of the acoustic logging tool 26b suitable for the pulse-echo measurement. The acoustic logging tool 26b may have a transducer 71 and one or more centralizers 73 so that the tool 26b may be centralized as it rotates to insonify the casing 22 with the transducer 71. The transducer 71 may transmit acoustic energy 73 normally to the surface of the casing 22 so as to excite a thickness resonance in the casing 22. The acoustic energy that is reflected back, represented as the reflected waves 75, may be collected at the same transducer 71 and processed to evaluate characteristics of the integrity of the wellbore 16, such as the condition of the annular fill 18 behind the casing 22. The annular fill 18 affects the temporal decay of the thickness resonance of the reflected energy. For example, fluid in the annulus 20 results in a thickness resonance having prolonged ringing while annular fill 18 that is bonded generally dampens the thickness resonance. In accordance with embodiments of the present techniques, effects of the annulus on the reflected energy may be quantified in terms of an apparent acoustic impedance of the annular fill 18. Generally, impedance is the product of density and compressional wave velocity, and a measurement or estimate of the acoustic impedance may be used for evaluation of the integrity of the wellbore 16 and/or the characteristics of the annular fill 18 behind the casing 22.

One or more aspects or embodiments of the present techniques may be applicable to flexural mode, pitch-catch measurements such as those obtained by the tool 26a in FIG. 2 and thickness mode, pulse-echo measurements such as those obtained by the tool 26b in FIG. 3. Accordingly, the acoustic data 36 used in the model-based inversions of the present techniques may be from tool 26a, tool 26b, or from any other suitable acoustic logging tool, generalized as tool 26. Furthermore, acoustic data 36 may include acoustic waveforms or reflected waves from the casing 22, the annular fill 18, the formation 14, and/or any of the interfaces between mud and the casing 22, annular fill 18, formation 14. The acoustic data 36 may also be referred to as the input waveforms or measured waveforms.

Some acoustic processing techniques estimate the acoustic impedance of the annulus by using a one dimensional transmission line model where the thickness resonance is dependent on reflection coefficients at the inner and outer walls of the casing. The reflection coefficients may be defined in terms of the acoustic impedance of the media at each of these interfaces (e.g., interface between the drilling fluid and casing material, interface between casing and the annular material, etc.). A normalized group delay may be computed from the reflected waves and estimates of the annular impedance may be obtained by matching the observed group delay to the normalized group delay predicted by the one-dimensional model using the estimated annular impedance. The impedance of the casing and mud may be assumed. This one-dimensional model may suitably approximate cases where the energy remains mostly compressional and propagates normally to the casing wall which is assumed to be planar at the region where the transducer beam insonifies the casing wall, and where shear mode conversion is insignificant. The raw estimates may be corrected with a look up table generated offline with a full three-dimensional model which accounts for the effects neglected in the one dimensional transmission line model.

However, in certain cases, such as when casings are relatively thicker (e.g., thicker than ~12 mm) or when the tool becomes eccentered, three-dimensional propagation effects and shear mode conversion are no longer insignificant and may impact the accuracy and robustness of the results from conventional acoustic inversion processing techniques. Moreover, the conventional processing technique of using a known or assumed mud impedance may also contribute to inaccuracies, as many weighted muds and specially formulated muds may not have known mud impedances. The use of assumptions in mud impedance may thereby also impact the accuracy of estimating the acoustic impedance of the annulus.

In one or more embodiments of the present techniques, a model-based inversion method may use a three-dimensional model in an inversion for both annular impedance and mud impedance.

Pulse-Echo Measurement Modeling

Figure 4:
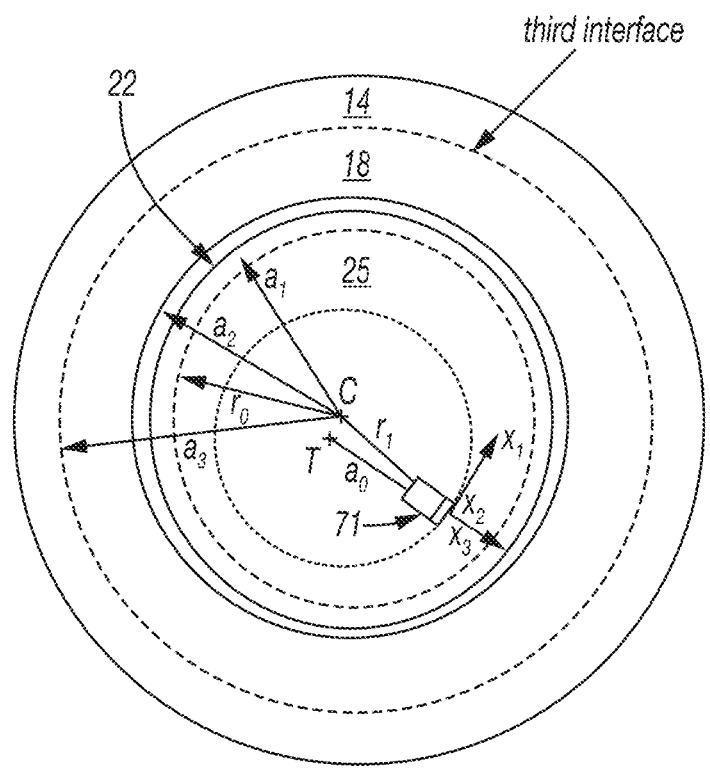
FIG. 4 is a cross-sectional representation of an acoustic logging tool in a cased wellbore and geometric representation of a pulse-echo acquisition in accordance with one or more example embodiments.

A geometric representation of a pulse-echo acquisition is shown in FIG. 4, which is a cross-sectional representation of an acoustic logging tool 26 in a cased wellbore 16. In FIG. 4, a transducer 71 disposed in the acoustic logging tool 26 insonifies a cylindrically layered wellbore 16 having casing 22, annular fill 18 around the casing 22, and formation 14 around the annular fill 18. The acoustic tool 26 may be deployed within the casing 22 area, where there may be drilling fluid (i.e., mud) 25. When energized, the transducer 71 excites pressure waves that propagate within the borehole and interact with the casing 22. In reception mode, the transducer 71 receives the acoustic energy reflected and/or scattered back from the casing 22 and this energy is converted into a transient electric voltage. The borehole fluid, casing and cement annulus may be assumed to be isotropic and homogeneous in the volume probed by the transducer such that a linear elastic theory is applicable.

The time-domain voltage $e_T(t)$ (i.e., the voltage representative of the reflected acoustic energy) generated by the transducer 71 in reception mode can be derived from its frequency-domain counterpart $E_T(\omega)$ via the Fourier transform below:

$$e_T(t) = \frac{1}{2\pi} \int E_T(\omega) e^{-i\omega t} d\omega, \quad (1)$$

where $\omega$ is the angular frequency. In the numerical implementation, Equation (1) is carried out via a fast Fourier transform (FFT) algorithm.

Pulse-echo measurements may be affected by different transducer configurations, and pulse-echo modeling may also be adapted accordingly. Pulse-echo modeling for a general transducer may involve computing the transducer voltage by deriving the spectral wavenumber integral from the conventional surface integral. The frequency-domain counterpart $E_T(\omega)$ of the time-domain voltage may be computed in terms of spectral integrals over the spatial wavenumber $(\nu, \beta)$ decomposition where $\nu$ and $\beta$ respectively represent the azimuthal and axial continuous wavenumbers that correspond to infinite-azimuthal ($\phi$) and infinite-axial (z) coordinates. More specifically, it can be written in terms of the spectrum of the pressure radiated at some intermediary radius $r_0$, $$E_T^{(\rho)}(\omega) = \qquad (2)$$

$$\frac{\gamma(\omega)}{\pi^3 \omega \rho_f} \int \int_{-\infty}^{\infty} \hat{p}^T(r_0; \nu, \beta) \hat{p}^T(r_0; -\nu, -\beta) \Gamma_{glob}(\nu, \beta) \frac{H_\nu^{(1)}(\kappa_f a_1)}{H_\nu^{(2)}(\kappa_f a_1)} \times$$

$$[H_\nu^{(1)}(\kappa_f r_0)]^{-2} d\nu d\beta,$$

with $\kappa_f = \sqrt{k_f^2 - \beta^2}$, $\text{Re}\{\kappa_f\}$, $\text{Im}\{\kappa_f\} > 0$, and $k_f = \omega/\nu_f$, $\nu_f$ represents the sound speed in the mud and $\rho_f$ is the mud density. The quantity $\hat{p}^T(r_0; \nu, \beta)$ is the spectral amplitude of the pressure wave at $r = r_0$ (see FIG. 4) radiated by T within the $(\nu, \beta)$ decomposition, and $H_\nu^{(1,2)}$ are outgoing (1) and incoming (2) Hankel functions of real order $\nu$; $\Gamma_{glob}(\nu, \beta)$ is a spectral reflection coefficient accounting for the interaction of the $(\nu, \beta)$ wave component with the cylindrically layered medium with reference to the innermost interface at $a_1$. The frequency-dependent quantity $\gamma(\omega)$ depends upon the electrical internal and load impedances of T in its receiving state and is introduced to account for the temporal spectrum of the transmitter and receiver electronics. It may be derived from a suitable calibration experiment.

The pressure spatial spectrum $\hat{p}^T(r_0; \nu, \beta)$ may be computed using a direct approach via a spectral Rayleigh-Sommerfeld formula. This uses a projected radial velocity distribution at a cylindrical surface of radius $r_T$ in front of the transducer face (see FIG. 4) to compute a corresponding velocity spatial spectrum $\hat{v}_r^T(r_T; \nu, \beta)$. In the parametric high-frequency regime of interest, where $k_f a_1 \gg 1$, the Hankel functions in equation 2 can be approximated by their high-frequency Debye asymptotic forms which yield expressions that are convenient for efficient numerical implementation. Therefore, based on the direct approach and Debye-approximation, the transducer voltage can be written as:

$$E_T^{(v)}(\omega) \sim \qquad (3)$$

$$\frac{\gamma(\omega)\omega\rho_f r_T}{2\pi^2} \int\int_{-\infty}^{\infty} \frac{1}{\kappa_f \sin\gamma_T} \hat{v}_r^T(r_T; v, \beta)\hat{v}_r^T(r_T; -v, -\beta)\Gamma_{glob}(v, \beta)$$

$$\exp\{iP_T(v,\beta)\}dvd\beta,$$

where $$P_T(v, \beta) = 2[\kappa_f(a_1\sin\gamma_1 - r_T\sin\gamma_T) - v(\gamma_1 - \gamma_T)], \qquad (4)$$

and $$\gamma_T = \cos^{-1}\frac{v}{\kappa_f r_T}. \qquad (5)$$

Circular transducers with axisymmetric aperture profiles may be modeled by a complex-transducer-points (CTP) technique, based on the complex-source-point (CSP) technique, which circumvents the computationally intensive integrations over the transducer apertures and may also be used for configurations where the aperture geometries do not conform to the geometry of the structures insonified. By the CSP method, an isotropic spherical wave may be converted into a quasi-Gaussian beam (in real space) when the coordinates of the source point are displaced into complex space. Thus, a CSP accurately models a finite, quasi-Gaussian beam source. By reciprocity, evaluation of an acoustic field at a complex point in space models reception with a finite, quasi-Gaussian beam receiver. The complex-transducer-point (CTP) method uses both complex receiver points (CRPs) and CSPs to model ultrasonic measurements with flat and focused transducers which have quasi-Gaussian profiles. Transducers with more general profiles are treated as collections of (typically, a small number of) CTPs. Boundary-value (i.e. interaction) problems involving wave transmission, scattering, reception, etc., solvable for real source fields observed at real points using already available techniques may then be applied to flat and focused beam-type sources and receivers by analytic continuation via the CTP method.

The transducer voltage received by a circular transducer can be written as $$E_{CTP}^{cyl}(\omega) \sim \qquad (6)$$

$$\frac{\gamma(\omega)\omega\rho f}{8\pi^2}\int\int_{-\infty}^{\infty}\frac{1}{k_f\tilde{r}_T\sin\tilde{\gamma}_T}\Gamma_{glob}(v,\beta)\exp\{iP_{cyl}(v,\beta)\}dvd\beta,$$

where $$P_{cyl}(v,\beta) = 2[k_f(a_1\sin\gamma_1 - \tilde{r}_T\sin\tilde{\gamma}_T) - v(\gamma_1 - \tilde{\gamma}_T)], \qquad (7)$$

and $$\tilde{\gamma}_T = \cos^{-1}\frac{v}{k_f\tilde{r}_T}. \qquad (8)$$

where the tilde sign ~ refers to the complex coordinates of the CTPs. Specifically, $\tilde{r}_T = r_T + ib_T \cos\theta$. The real positive parameter $b_T$ is the CTP beam Fresnel length; $b_T$ is related to the 1/e width of the CTP transducer, $W_T$, through $W_T = \sqrt{2b_T/k_f}$. The angle θ is the transducer pointing direction with respect to the casing wall normal direction.

Figure 5:
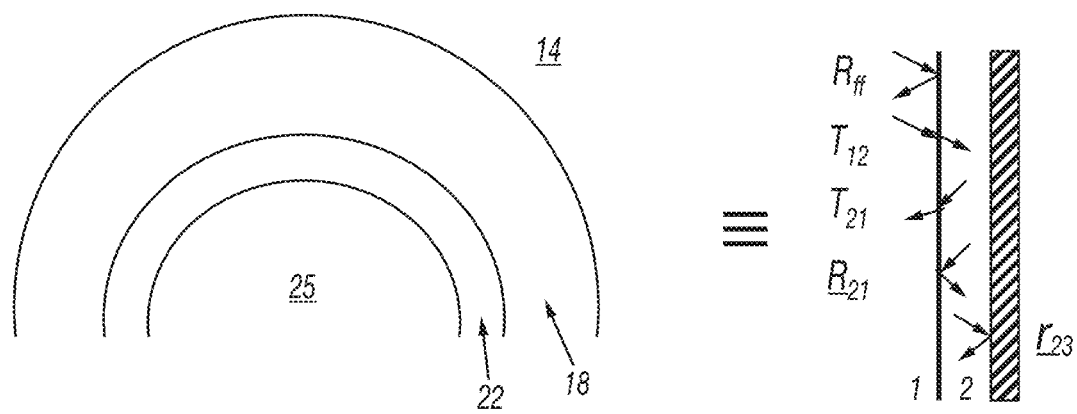
FIG. 5 is a schematic representation of layers and interfaces in a cased wellbore in accordance with one or more example embodiments.

For the high frequency cases, the cylindrical wave reflection coefficient can be approximated by the corresponding local plane wave reflection coefficient, as represented in the schematic of FIG. 5. The relation between the cylindrical wavenumber (v, β) and the 'planar' wavenumber k is represented as:

$$k = \sqrt{v^2/a_i^2 + \beta^2}, \qquad (9)$$

where $a_i$ is the radius of the interface at which the wave reflection is considered; the first, second, and third interfaces represent the mud-casing interface 1, casing-annulus interface 2, and annulus-formation interface 3 respectively. The 2×1 vectors are denoted by boldfaced quantities (e.g., T) and 2×2 matrices by underlined boldfaced quantities (e.g., $\underline{R}$). The $\underline{\Gamma}$ represents global reflection coefficients accounting for at least one layer, whereas R represents a single-interface reflection coefficient which could in fact be a matrix since elastic media support two types of waves: compressional and shear. In some embodiments, except for the borehole fluid, the other layers are all elastic in nature.

Referring to FIG. 4, $\Gamma(k = \sqrt{v^2/a_i^2 - \beta^2})$ can be expressed in terms of coefficients of the first layer and a global reflection coefficient $\Gamma_{23}(k)$ which accounts for the effect of the annulus and formation, as in the equation below:

$$\underline{\Gamma}_{glob} = R_{ff} + (T_{21})^t \underline{E}_2 \underline{\Gamma}_{23} \underline{E}_2 (\underline{I} - \underline{F}_2)^{-1} T_{12}, \qquad (10)$$

where $\underline{I}$ is the identity matrix, $\underline{E}_2$ is the propagator matrix in layer 2 and defined below, $\underline{T}_{12}$ and $\underline{T}_{21}$ are transmission vectors accounting for transmission at the first interface of traveling P and S waves (the first numerical in the subscript on these quantities indicates the incidence layer); and the superscript$^t$ denotes the transpose operation. $\underline{F}_2$ is the reverberation matrix accounting for round trip propagation of compressional (P) and shear (S) waves within the casing, with coupling between them at the layer interfaces, as represented in the equation below:

$$\underline{F}_2 = \underline{R}_{21}\underline{E}_2\underline{\Gamma}_{23}\underline{E}_2, \qquad (11)$$

where $\underline{R}_{21}$ is a reflection matrix accounting for reflection and coupling of P and S plane waves at the interface between the borehole fluid and casing with incidence from the casing (hence the subscript$_{21}$); $R_{ff}$ accounts for pressure (P) plane wave reflection at the first interface (assuming the casing to be infinite in extent). In the cases where the formation is ignored, $\underline{\Gamma}_{23}$ is equal to $\underline{R}_{23}$, which is similar to $\underline{R}_{21}$ but at the second interface.

The propagation matrix $\underline{E}_2$ is defined as follows, $$E_2 = \begin{pmatrix} e^{ik_{p_2}h_1} & 0 \\ 0 & e^{ik_{s_2}h_1} \end{pmatrix} \qquad (12)$$

with $h_1 = a_2 - a_1$, the casing thickness, and $$\kappa_{p_i,s_i} = \sqrt{k_{p_i,s_i}^2 - k^2} = \sqrt{k_{p_i,s_i}^2 - (v^2/a_i^2 + \beta^2)};\ k_{p_i,s_i} = \omega/v_{p_i,s_i}, \qquad (13)$$

where $v_{p_i,s_i}$ are the compressional and shear velocities of the $i^{th}$ layer. For the outermost layer extending to infinity, $\kappa_{p_i,s_i}$ are accompanied by the conditions, $$Im\{\kappa_{p_i,s_i}\} \geq 0, \qquad (14)$$

to ensure decay of the fields at $r \to \infty$. The reflection and transmission vectors and matrices used in equations (10) and (11) are defined according to equations (15) and (16) below:

$$R_{21} = \begin{pmatrix} \overleftarrow{R}_{p_2,p_2} & \overleftarrow{R}_{s_2,p_2} \\ \overleftarrow{R}_{p_2,s_2} & \overleftarrow{R}_{s_2,s_2} \end{pmatrix},\ R_{23} = \begin{pmatrix} \overrightarrow{R}_{p_2,p_2} & \overrightarrow{R}_{s_2,p_2} \\ \overrightarrow{R}_{p_2,s_2} & \overrightarrow{R}_{s_2,s_2} \end{pmatrix}, \qquad (15)$$

-continued $$T_{21} = \begin{pmatrix} \overline{T}_{p2,f} \\ \overline{T}_{s2,f} \end{pmatrix}, \quad T_{12} = \begin{pmatrix} \overrightarrow{T}_{f,p2} \\ \overrightarrow{T}_{f,s2} \end{pmatrix},\quad(16)$$

To distinguish between the elements of $\underline{R}_{21}$ and $\underline{R}_{23}$ as they pertain to the two interfaces of the casing, the upper arrow indicates the inward direction (←) from the casing to the borehole fluid, and the outward direction (→) from casing to the annular fill. The matrix elements in equations (15) and (16) represent single-interface plane-wave reflection, coupling, and transmission coefficients. The above plane-wave reflection and transmission coefficients may be evaluated at $k=\sqrt{v^2/a_i^2-\beta^2}$ where $a_i$ is the radius of the interface corresponding to its respective coefficient.

In some cases, the tool may be eccentered, as represented in FIG. 4 which shows the tool eccentering on the right. The eccentering vector is defined for the tool center T with respect to the casing center of curvature C and has magnitude $e_1$. The azimuthal position of the transducer on the tool periphery with respect to the eccentering direction is denoted by $\phi$; $\theta$ denotes the angle of incidence, and $r_T$ denotes the transducer radius with respect to C. The tool standoff with respect to the casing is then simply given by $r=a_1-r_T$. The following equations may be derived from the geometry:

$$\theta = \arctan\frac{e_1\sin\phi}{a_0+e_1\cos\phi},\quad(17)$$
$$r_T = \sqrt{a_0^2+e_1^2+2a_0e_1\cos\phi}.$$

Model-Based Waveform Inversion Workflow
Estimating Crude Casing Thickness

In accordance with the present techniques, embodiments involve a model-based waveform inversion method which uses a three-dimensional forward model to determine an apparent acoustic impedance of the annular fill 18, a thickness of the casing 22, and/or an apparent impedance of the mud 25. FIG. 6 is a block diagram of a workflow 80 representing one or more embodiments of the present techniques. The workflow 80 involves inputting (block 82) acoustic data 36 (e.g., acoustic waveforms, reflected waves, etc. received at a transducer 70, 71). The workflow 80 may involve using acoustic data 36 to estimate (block 84) a crude casing thickness. While a nominal casing thickness may be available, the thickness of a casing may vary significantly along its length, and an empirical estimate of a crude casing thickness may be more accurate than a nominal or assumed thickness.

The casing thickness is related to the resonant frequency of the reflected waves. This relationship is determined by the propagator matrix equations (10), (11), and (12) above via the spectral integrals over the spatial wavenumber (ν,β). In some embodiments, for near-normal incidence of acoustic energy, the spectral integral may be mostly small tangential wavenumbers, such that the resonant frequency may be approximated in terms of a one-dimensional model of time of flight in the casing, $$f_{res} \sim \frac{v_{p,cas}}{2\,casH}$$

where casH is the casing thickness and $v_{p,cas}$ is the casing compressional wave velocity. In such near-normal incidence, the resonant frequency may manifest in the signal spectrum as a notch due to the second interface echoes being 180 degrees out of phase with the main specular from the first interface. The group delay spectrum near the vicinity of the nominal thickness may be searched for this notch in magnitude to identify the resonance frequency. In some embodiments, higher order harmonics also display the notch in the received signal spectrum and may also be used to estimate the resonance frequency.

The crude casing thickness may then be estimated (block 84) by treating $$f_{res} \sim \frac{v_{p,cas}}{2\,casH}$$

as an equality and computing for casH. In some embodiments, the estimated resonance frequency may be empirically corrected to further improve the accuracy of the estimated resonance frequency, and accordingly, the estimated crude casing thickness.

Tool Positioning and Mud Velocity

The workflow 80 may further involve estimating (block 86) the tool position in the wellbore 16, including estimating tool eccentering. Data acquisition is typically performed with a centralized tool, and conventional techniques assume that eccentering is negligible and do not consider eccentering in conventional modeling techniques. However, acoustic logging tools sometimes do become eccentered, especially in deviated wells. Eccentering may significantly affect the acquired data, and ignoring its effects may reduce the accuracy of modeled outputs.

The present techniques involve one or more embodiments for estimating (block 86) the tool position. One embodiment involves using a strong casing specular pulse (i.e., the initial reflected wave from the inner wall of the casing 22) to determine the time of flight estimation by examining the envelope and determining the onset time. The time of flight may then be used to determine tool eccentering as well as the acoustic velocity in the mud. The casing outer diameter may be known and assumed to be circular, and using the initial casing estimate, the inner radius of the casing may be computed. By combining these estimates with the known tool radius and using the time of flight data for a complete azimuthal scan, the tool eccentering and mud acoustic velocity may be computed by fitting the geometry, assuming the tool center has not moved during the scan.

Extended Kalman Filtering

Another embodiment for estimating (block 86) the tool position and/or mud velocity uses a Kalman filter to track the tool motion and estimate tool positioning. A more detailed representation of estimating (block 86) tool position and mud velocity using a Kalman filter is provided in FIG. 7, which is a schematic of a workflow 86a inputting a reflected waveform (e.g., acoustic data 36) to compute (block 110) a time of flight. The workflow 86a may be used to estimate an eccentering state vector $e_k=[e_{x,k}\ e_{y,k}\ \dot{e}_{x,k}\ \dot{e}_{y,k}\ s_{mud,k}]^T$ where each frame step k corresponds to an acquisition at a particular depth and azimuth. The variables $e_{x,k}\ e_{y,k}$ are tool eccentering coordinates and the variables $\dot{e}_{x,k}\ \dot{e}_{y,k}$ represent the corresponding rate of change of the tool position, and the variable $s_{mud,k}$ represents the mud acoustic slowness. The update matrix A below may update the eccentering state taking into account their change rate.

$$A = \begin{bmatrix} 1 & 0 & 1 & 0 & 0 \\ 0 & 1 & 0 & 1 & 0 \\ 0 & 0 & 1 & 0 & 0 \\ 0 & 0 & 0 & 1 & 0 \\ 0 & 0 & 0 & 0 & 1 \end{bmatrix}. \quad (18)$$

The update process for the state sequence $e_k$ can be written as $$e_k = A\, e_{k-1} + w_k \quad (19)$$

where $w_k$ is the process noise.

The Kalman state at step k can be related to the time of flight observations by computing the tool standoff $r_k$ in the equation below $$r_k = a_{1,k} - \sqrt{a_0^2 + e_{x,k}^2 + e_{y,k}^2 + 2a_0 e_{x,k} \cos(\varphi_{a,k}) + 2a_0 e_{y,k} \sin(\varphi_{a,k})}, \quad (20)$$

and then multiplying by $s_{mud}$: $t_{k,spec,est} = 2r_k s_{mud,k}$. Since this relation is non-linear, the extended Kalman filter may be used to compute derivatives of the predicted observations with respect to the state variables. In one embodiment, the equation $$r_k = (a_{1,k} - a_0) - e_{x,k} \cos(\phi_{a,k}) - e_{y,k} \sin(\phi_{a,k}). \quad (21)$$

may be used for estimating the standoff and computing the derivatives. The extended Kalman filter as detailed below may then be implemented to estimate the tool positioning (e.g., coordinates $e_{x,k}$, $e_{y,k}$) and mud velocity (e.g., via mud slowness $s_{mud,k}$).

---

Algorithm 1 Extended Kalman Filter

Require: $t_{spec,obs}$: set of N peak travel times, $S_p$: process noise covariance matrix, $S_n$: observation noise covariance 1: Initialize $\Sigma_0$, $e_0$
2: for k = 1 to N do
3: $\quad e_{k,pred} = A\, e_{k-1}$
4: $\quad \Sigma_{k,pred} = A\, \Sigma_{k-1}\, A^T + S_p$
5: $\quad \Sigma_k = \Sigma_{k,pred} + \left.\dfrac{dc_k(x)}{dx}\right|_{e_{k,pred}} \left.\dfrac{dc_k(x)}{dx}\right|_{e_{k,pred}}^T \dfrac{1}{S_n}$
6: $\quad \sigma_{innov} = \left.\dfrac{dc_k(x)}{dx}\right|_{e_{k,pred}}^T \Sigma_{k,pred} \left.\dfrac{dc_k(x)}{dx}\right|_{e_{k,pred}} + S_n$
7: $\quad G = \Sigma_{k,pred} \left.\dfrac{dc_k(x)}{dx}\right|_{e_{k,pred}} \dfrac{1}{\sigma_{innov}}$
8: $\quad e_k = e_{k,pred} + G\,(t_{k,spec,obs} - c_k(e_{k,pred}))$ return $(e_k)_{k=1}^N$

---

Figure 8:
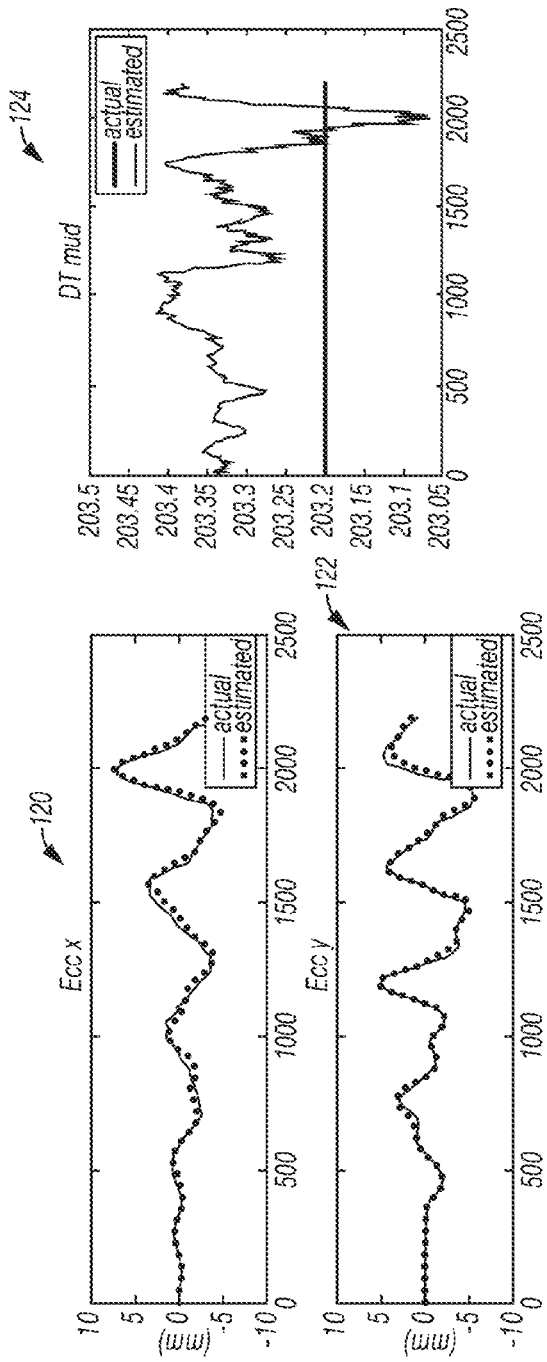
FIG. 8 are plots showing tool positioning and mud slowness in accordance with one or more example embodiments.

FIG. 8 are simulated plots showing estimates of tool eccentering x and y coordinates and acoustic velocity of mud by applying the extended Kalman filter to the reflected wave transit time data. As shown, the estimated quantities are close to the actual quantities. Plots 120 and 122 are the coordinates (x and y, respectively) of the tool center with respect to the casing center, and plot 124 is the acoustic slowness of the mud.

The estimated crude casing thickness casH and the estimated tool position and mud velocity may be input (block 88) in a three-dimensional forward model to obtain estimates for the acoustic impedance of the annular fill $Z_a$, the thickness of the casing casH, and the acoustic impedance of mud $Z_m$. Because of the more accurate casing thickness measurement and the consideration of tool eccentering and mud velocity, the initial estimates $Z_a$, casH, and $Z_m$ may be more accurate inputs for the inversion of the present techniques. The initial estimates $Z_a$, casH, and $Z_m$ may be used to calculate (block 90) a modeled waveform.

Estimation of Specular Reflection Signal

The workflow 80 further involves estimating (block 92) a specular reflection signal, which is a signal received by the transducer (e.g., transducer 70, 71) when the casing 22 is assumed to be infinitely thick. The specular reflection signal is a signal that assumes there are no layers (e.g., no cement or formation, etc.) behind the casing and no interaction of the incident acoustic wave with any layers or interfaces behind the casing. The specular reflection signal is therefore a signal free of any resonance modes.

Figure 9:
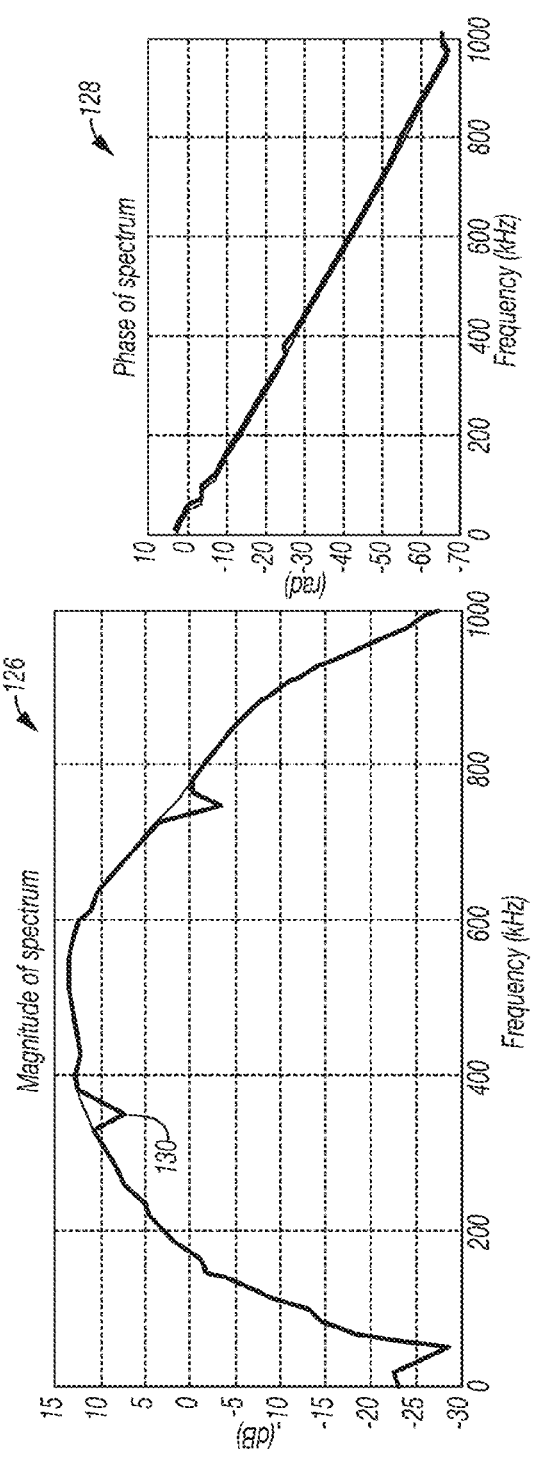
FIG. 9 are plots representing a magnitude and phase spectrum of a waveform used to estimate a specular reflection signal in accordance with one or more example embodiments.

In one or more embodiments, estimating (block 92) the specular reflection signal may be estimated from the measured waveform (e.g., the total reflection waveform from the input acoustic data 36). The spectrum magnitude and phase of the total reflection signal may be obtained using FFT. FIG. 9 shows a plot 126 representing the spectrum magnitude of the total reflection signal while plot 128 represents a phase of the total reflection signal. Notches 130 in the spectrum magnitude plot 126 may correspond to the thickness resonance frequency in the magnitude spectrum and be identified using a local peak finding algorithm or any suitable filter or algorithm and removed by spline interpolation. The spectrum of the specular signal is reconstructed by smoothing out the magnitude and phase around the notch frequency using spline or polynomial fitting and transformed back to the time domain to calculate (block 92) the estimated specular reflection signal.

In some embodiments, a modeled specular reflection signal may also be calculated (block 94) using similar techniques as for the estimated specular reflection signal, but using the modeled waveform, to result in a modeled specular reflection signal.

Spectrum Calibration of Modeled Waveform

The workflow 80 may then compare the modeled waveform with the measured waveform and filter (block 96) the waveforms for resonance regime waveforms. For example, in some embodiments, the modeled waveform and measured waveform may be matched (e.g., using cross correlation or another suitable technique to compare the two waveforms) and then low pass filtered. In some embodiments, the estimated specular reflection signal and modeled specular reflection signal may be used to calibrate (block 98) the modeled waveform to eliminate the effect of a frequency dependent quantity $\gamma(\omega)$ from the modeling equations (2) and (6). The ratio between the estimated specular reflection signal (from block 92) from the measured data and a modeled specular reflection signal (from block 94) is calculated and multiplied to the modeled waveform as shown in the equation below, to obtain a calibrated model waveform.

$$\text{Calibrated model waveform} = \quad (22)$$
$$FFT^{-1}\left(\dfrac{FFT(\text{Data specular})}{FFT(\text{Model specular})} \cdot FFT(\text{Model waveform})\right)$$

Figure 10:
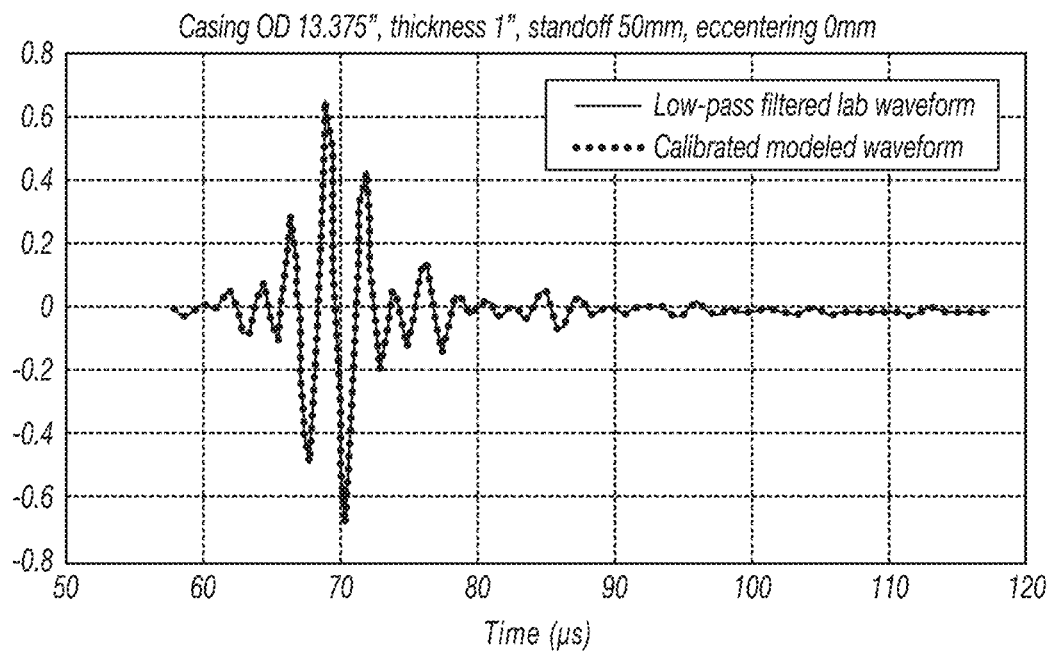
FIG. 10 is a comparison of a modeled waveform with a calibrated waveform in accordance with one or more example embodiments.

The modeled waveform after calibration is expected to have approximately the same $\gamma(\omega)$ function as the measured data. FIG. 10 is a plot showing a comparison between an experimental modeled waveform and a calibrated modeled waveform, both having been low-pass filtered. The two waveforms substantially match, which may indicate that the calibration process has removed the effect of unknown transducer response to the first order ($\gamma(\omega)$).

Data Selection for Waveform-Based Inversion

Figure 11:
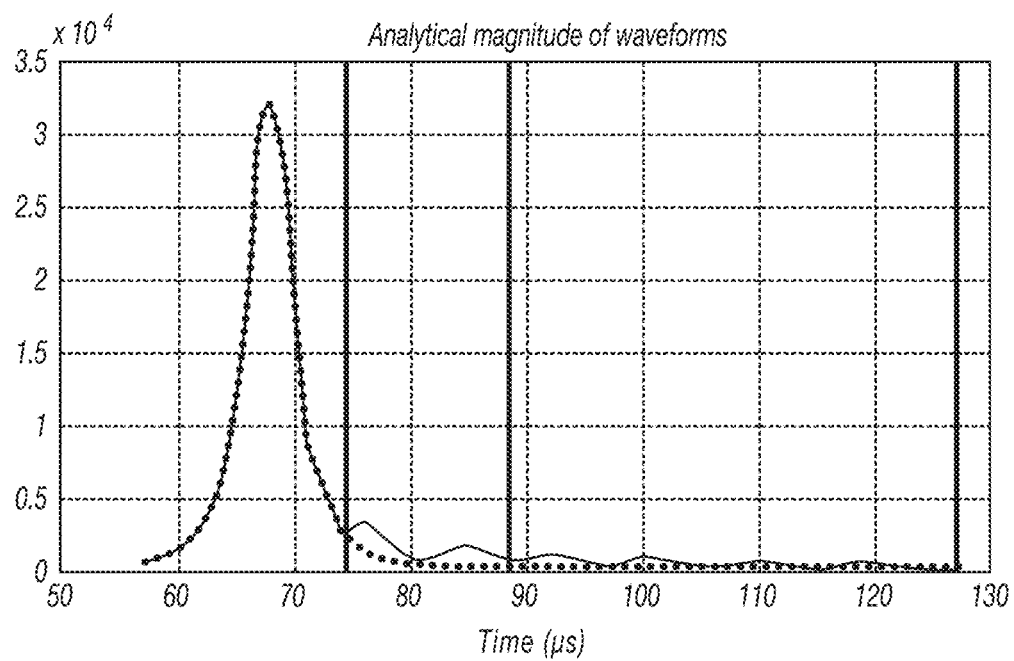
FIG. 11 is a plot a time window selection in accordance with one or more example embodiments.

In some embodiments, the workflow 80 also includes selecting (block 100) a time window for data fitting. Due to the finite recording time of measured data, the sampling of signal in the frequency domain may be coarse and sensitive to noise. By selecting the time window for data fitting, the data fitting may be constructed based on the waveform itself in the time domain. The time window for data fitting may be selected (block 100) based on the specular reflection signal, as the modeled waveform after calibration is expected to have approximately the same specular reflection signal as the measured data. By comparing the measured data with its estimated specular reflection signal, the earliest possible starting time for the time window may be identified. The start time and length of the time window may then be determined based on the conditions of the measured data. FIG. 11 illustrates the time window selection (block 100) using the measured data and its estimated specular reflection signal.

Cross-Correlation-Based Estimation for Casing Thickness

To measure the similarity of two waveforms or signals, cross correlation may be used. In some embodiments, assuming wfr1 and wfr2 are two waveforms having the same length N, their cross-correlation xcorr=xcorr(wfr1},wfr2) may be represented as $$xcorr(m) = \begin{cases} \sum_{n=0}^{m-1} wfr1(n)wfr2(n-m+N) & \text{if } m < N; \\ \sum_{n=0}^{2N-1+m} wfr1(n+m-N)wfr2(n) & \text{if } m \geq N. \end{cases} \quad (23)$$

where the one-sided lag m=1, 2, . . . 2N-1.

If the two waveforms are identical or similar (scaled versions of each other), the peak of their cross-correlation occurs at m=N. For two waveforms differing only by a shift t along the time-axis, the peak of their cross-correlation takes place at m=N+t. Therefore, the cross-correlation can be used to find out the value of time shift by locating the peak. For resonance regime waveforms, the similarity with respect to time is more sensitive to casing thickness than to other parameters. Embodiments may use a cross-correlation-based cost function to estimate the casing thickness. The cost function can be represented according to the equation below:

$$e(CasH)=P(CasH)-N \quad (24)$$

where P(CasH) is the location of the peak of xcorr(D, U), D is the measured waveform data, and U is the modeled waveform. The correct choice of CasH would drive this cost function towards 0. In some embodiments, an estimate of the crude casing thickness may be obtained from the resonance frequency of the waveform spectrum. This cost function as written may take integers or a continuous range with additional computational cost. Furthermore, a non-derivative based minimization routine should be used to find the zero of this cost function.

Waveform-Based Inversion for Cement Acoustic Impedance

The present techniques involve one or more embodiments of waveform-based inversion algorithms for estimating the cement acoustic impedance. One embodiment of a waveform-based inversion involves a two-parameter inversion, where both cement acoustic impedance and casing thickness are estimated simultaneously. Another embodiment of a waveform-based inversion involves a three-parameter inversion, where cement acoustic impedance, casing thickness, and mud acoustic impedance are estimated simultaneously. Because the acoustic wave reflections are highly sensitive to mud acoustic impedance, the three-parameter inversion may have less inversion sensitivity to mud properties compared to the two-parameter inversion.

In the three-parameter inversion, the mud velocity estimated from the time of flight of the signal (e.g., from block 86 of FIG. 6) may be used as an input. The mud impedance $Z_m$ may then estimated through the estimation of mud density. Therefore, the inversion sensitivity to mud impedance $Z_m$ may be reduced to the inversion sensitivity to mud velocity, which is close to a 1:1 ratio when estimating the impedance of the annular fill $Z_a$.

Two types of cost function have been proposed for both of the inversion algorithms. Equation (25) below is based directly on the waveform itself, $$\|\bar{e}(\bar{x})\|^2 = \frac{\sum_{j=1}^{M} |U_j(\bar{x}) - D_j|^2}{\left(\sum_{j=1}^{M} |D_j|^2\right)/M^2} \quad (25)$$

while equation (26) below is based on the envelope of the waveform, $$\|\bar{e}(\bar{x})\|^2 = \frac{\sum_{j=1}^{M} ||H(U)|_j(\bar{x}) - |H(D)|_j|^2}{\left(\sum_{j=1}^{M} |H(D)|_j^2\right)/M^2} \quad (26)$$

where |H(D)| and |H(U)| are the absolute values of the Hilbert transform of the measured data and modeled waveform, respectively. A derivative-based Gauss-Newton minimization routine, e.g. the MATLAB function lsqnonlin, or any other suitable function, can be used here to find the unknowns.

Experimental Results

Figure 12:
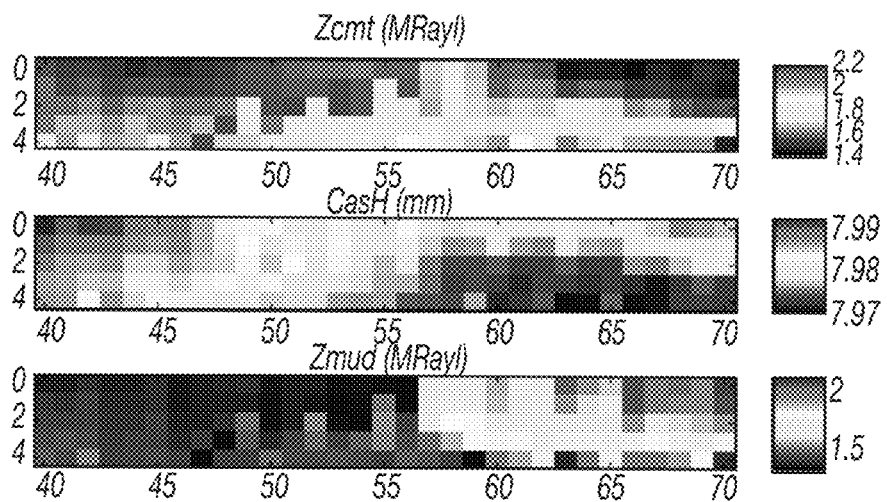
FIGS. 12 and 13 are estimates of apparent annular impedance, casing thickness, and apparent mud acoustic impedance from acoustic data measured with different transducers in accordance with one or more example embodiments.
Figure 13:
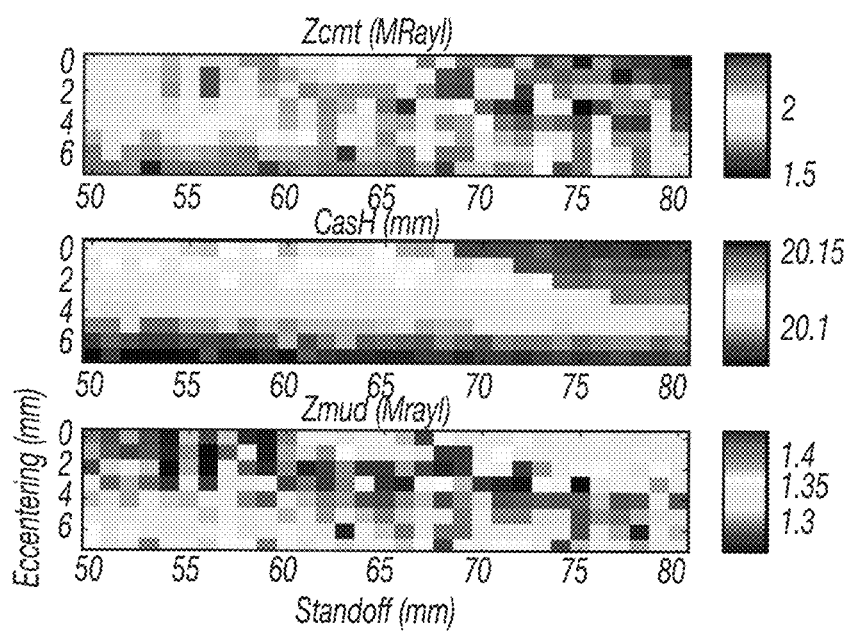

Example results are provided in FIGS. 12 and 13 to illustrate estimates of the apparent annular impedance $Z_a$, the casing thickness casH, and the apparent mud impedance $Z_m$ using experimental data. For each case, the measurements were taken for a range of standoffs and transducer eccenterings to simulate a realistic range of acquisition geometries. FIG. 12 shows the inversion results from data acquired with a rectangular transducer in casing of 8 mm thickness for a range of transducer standoffs and eccenterings. Overall the 3 parameter inversion results in accurate casing thickness estimates and annular impedance estimates that are within the measurement specifications while also estimating the apparent mud impedance. FIG. 13 shows the corresponding results for a 16 inch casing of 20 mm thickness, acquired with a circular transducer. The estimates are similar to the true values within an acceptable margin of error.

Any of the methods and processes described above can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of determining properties of a wellbore in a formation, the wellbore comprising a casing and an annular fill material between the casing and the formation, the method comprising:
   obtaining from an acoustic logging tool, acoustic data comprising acoustic waves reflected from the casing, the annular fill material, the formation, one or more interfaces between any of the casing, the annular fill material, and the formation, or combinations thereof;
   estimating a specular reflection signal based on the acoustic data;
   generating a modeled waveform using the estimated specular reflection signal and one or more model parameters comprising an estimated crude casing thickness, an estimated tool position, an estimated sound velocity of mud between the acoustic logging tool and the casing, an estimated impedance of the annular fill material, and an estimated impedance of the mud;
   matching the modeled waveform with the acoustic data; and
   determining one or more of a thickness of the casing, an apparent impedance of the annular fill material, and the impedance of mud, based on the match of the modeled waveform with the acoustic data.

2. The method of claim 1, further comprising estimating the crude casing thickness, the tool position, and the sound velocity in the mud, or combinations thereof, based on the acoustic data.

3. The method of claim 2, wherein the crude casing thickness is determined based on a resonant frequency of the acoustic data.

4. The method of claim 3, wherein estimating the crude casing thickness is based on $$f_{res} \sim \frac{v_{p,cas}}{2\ casH}$$

where $f_{res}$ is the resonant frequency, $v_{p,cas}$ is the casing compressional wave velocity, and casH is the casing thickness.

5. The method of claim 2, wherein the estimated tool position, the estimated mud sound velocity, or both, are estimated based on a time of flight estimation based on a time envelope of an initial reflection from an inner surface of the casing.

6. The method of claim 2, wherein the estimated tool position, the estimated mud sound velocity, or both, are estimated using a Kalman filter.

7. The method of claim 1, wherein estimating the specular reflection signal comprises:
   using a Fast Fourier Transform (FFT) to obtain a spectrum magnitude and phase from the acoustic data;
   identifying notches in the spectrum magnitude;
   removing the notches from the spectrum magnitude; and
   transform the spectrum magnitude and phase back to a time domain.

8. The method of claim 1, wherein generating the modeled waveform comprises using the estimated crude casing thickness, the estimated tool position, the estimated sound velocity in mud, and the estimated specular reflection signal.

9. The method of claim 1, further comprising estimating a modeled specular reflection signal with the modeled waveform.

10. The method of claim 9, further comprising calibrating the modeled waveform based on the estimated specular reflection signal and the modeled specular reflection signal.

11. The method of claim 10, wherein calibrating the modeled waveform is based on the relationship Calibrated model waveform =

$$FFT^{-1}\left(\frac{FFT(\text{Data specular})}{FFT(\text{Model specular})} \cdot FFT(\text{Model waveform})\right),$$

where Data specular is the estimated specular reflection signal, Model specular is the modeled specular reflection signal, Model waveform is the modeled waveform, and Calibrated model waveform is a calibrated modeled waveform.

12. The method of claim 1, wherein matching the modeled waveform with the acoustic data comprises selecting a time window for data fitting.

13. The method of claim 1, wherein matching the modeled waveform with the acoustic data comprises conducting a cross correlation of the modeled waveform and the acoustic data and identifying a peak of the cross correlation.

14. The method of claim 13, wherein determining the thickness of the casing based on a correlation comprises using a cross-correlation-based cost function to estimate the casing thickness based on a relationship $E(casH)=P(casH)-N$, where $P(casH)$ corresponds to a location of the peak, N is a length of each of the modeled waveform and the acoustic data, and casH is the estimated casing thickness.

15. The method of claim 1, further comprising determining an apparent acoustic impedance of the annular material and an apparent acoustic impedance of mud adjacent to the acoustic logging tool in the casing.

* * * * *